United States Patent
Bethel

[11] Patent Number: 5,800,762
[45] Date of Patent: Sep. 1, 1998

[54] PROCESS FOR DECORATING ELECTRICAL CORDS

[76] Inventor: Eunice A. Bethel, 1211 Cass St., Gary, Ind. 46403

[21] Appl. No.: 761,292

[22] Filed: Dec. 6, 1996

[51] Int. Cl.$^6$ ............................................. B29C 61/02
[52] U.S. Cl. ........................... 264/230; 264/132; 264/293
[58] Field of Search ................................. 264/230, 132, 264/293

[56] References Cited

U.S. PATENT DOCUMENTS

| | | | |
|---|---|---|---|
| 3,379,218 | 4/1968 | Conde | 138/99 |
| 3,847,721 | 11/1974 | Evans | 264/230 |
| 3,900,697 | 8/1975 | Yotsugi | 174/5 R |
| 4,287,011 | 9/1981 | Derbyshire | 264/230 |
| 4,705,657 | 11/1987 | Poulin | 264/230 |
| 4,899,414 | 2/1990 | Irwin | 15/97 |
| 4,939,778 | 7/1990 | Tomberlin | 379/438 |
| 5,435,871 | 7/1995 | Streit | 156/201 |

FOREIGN PATENT DOCUMENTS 3504380  8/1986  Germany ........................ 264/230

*Primary Examiner*—James Derrington
*Attorney, Agent, or Firm*—Joseph N. Breaux

[57] ABSTRACT

A decorating process including the steps of 1) providing a length of heat shrinkable tubing having a lateral insertion slit formed along the entire length thereof into a passageway running the entire length thereof, 2) positioning a length of electrical cord laterally through the lateral insertion slit into the passageway of the heat shrinkable tubing, and 3) applying heat to a top section of the heat shrinkable tubing located opposite the lateral insertion slit for a sufficient time to shrink the top section of the heat shrinkable tubing. In a preferred embodiment, the heat shrinkable tubing provided includes an outwardly directed interlocking lip defining one edge of the lateral insertion slit and an inwardly directed interlocking lip defining an opposite edge of the lateral insertion slit. The outwardly and inwardly directed interlocking lips are interlockable to maintain the heat shrinkable tubing closed around a length of electrical cord. When this type heat shrinkable tubing is provided, the process further includes moving the outwardly and inwardly directed interlocking lips into interlocked relationship. The heat shrinkable tubing can be provided in any desired color and, if desired, can be provided with an exterior surface embossed with a pattern such as a wood grain, a holiday pattern, snake skin, etc.

2 Claims, 2 Drawing Sheets

PROCESS FOR DECORATING ELECTRICAL CORDS

TECHNICAL FIELD

The present invention relates to methods of concealing a utilitarian article within a home or office and more particularly to a process for decorating electrical cords requiring the step of providing a length of heat shrinkable plastic tubing having a lateral insertion slit formed along the length thereof, positioning the length of heat shrinkable tubing laterally over a section of electrical cord through the lateral insertion slit; and heating the length of heat shrinkable tubing to cause at least a section of the heat shrinkable tubing to conform to the contour of the electrical cord.

BACKGROUND OF THE INVENTION

Electrical cords are necessary to supply power to appliances and lamps. Although electrical cords are necessary, the electrical cords are often supplied in a color that detracts from the decor of the room. It would be benefit, therefore, to have a process for decorating an electrical cord to match the decor of a room. It would of course be a further benefit if the decorating method was easily successfully practiced with little or no training and utilized readily available tools.

SUMMARY OF THE INVENTION

It is thus an object of the invention to provide a process for decorating electrical cords to match the decor of a room that is easily practiced.

It is a further object of the invention to provide a process for decorating electrical cords that requires only common household devices to successfully practice.

It is a still further object of the invention to provide a process for decorating electrical cords that accomplishes both of the above objects in combination.

Accordingly, a process for decorating electrical cords is provided. The decorating process includes the steps of 1) providing a length of heat shrinkable tubing having a lateral insertion slit formed along the entire length thereof into a passageway running the entire length thereof, 2) positioning a length of electrical cord laterally through the lateral insertion slit into the passageway of the heat shrinkable tubing, and 3) applying heat to a top section of the heat shrinkable tubing located opposite the lateral insertion slit for a sufficient time to shrink the top section of the heat shrinkable tubing. In a preferred embodiment, the heat shrinkable tubing provided includes an outwardly directed interlocking lip defining one edge of the lateral insertion slit and an inwardly directed interlocking lip defining an opposite edge of the lateral insertion slit. The outwardly and inwardly directed interlocking lips are interlockable to maintain the heat shrinkable tubing closed around a length of electrical cord. When this type heat shrinkable tubing is provided, the process further includes the step of moving the outwardly and inwardly directed interlocking lips into interlocked relationship. The heat shrinkable tubing can be provided in any desired color and, if desired, can be provided with an exterior surface embossed with a pattern such as a wood grain, a holiday pattern, snake skin, etc.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
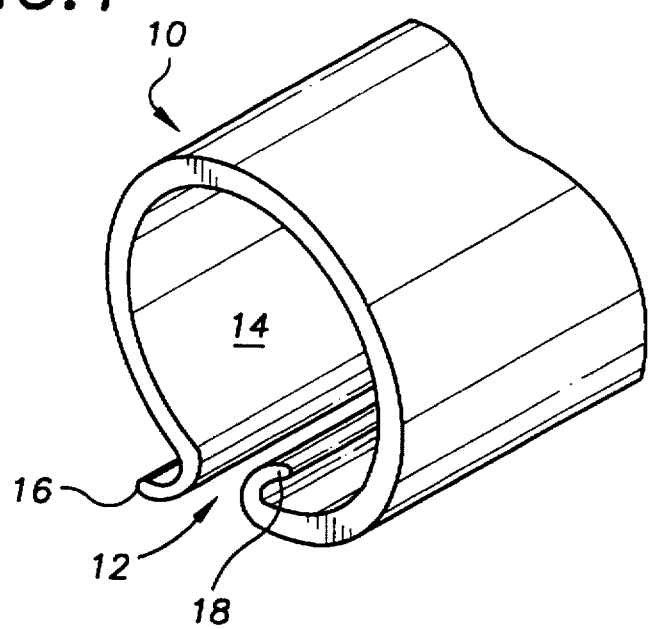
FIG. 1 is a perspective view of a first embodiment of the laterally slit shrink tubing used in the process for decorating electrical cords of the present invention showing the cord passageway, the outwardly directed interlocking lip, the inwardly directed interlocking lip, and the lateral insertion slit.

An exemplary embodiment of the process for decorating electrical cords of the present invention is now described with reference to FIGS. 1-6. With reference to FIG. 1, an exemplary decorating process includes the step of providing a length of heat shrinkable tubing 10 having a lateral insertion slit 12 formed along the entire length thereof that provides access into a passageway 14 running the entire length. Heat shrinkable tubing 10 is thin walled PVC heat shrink tubing having a shrink temperature of below two-hundred degrees Fahrenheit (200°) and includes an outwardly directed interlocking lip 16 that defines one edge of lateral insertion slit 12 and an inwardly directed interlocking lip 18 that defines an opposite edge of lateral insertion slit 12.

Figure 2:
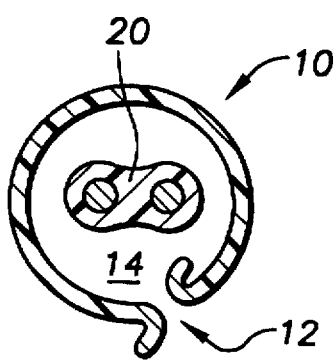
FIG. 2 is a sectional view of the tubing of FIG. 1 with a representative electrical cord positioned within cord passageway after insertion of the cord through the lateral insertion slit.
Figure 3:
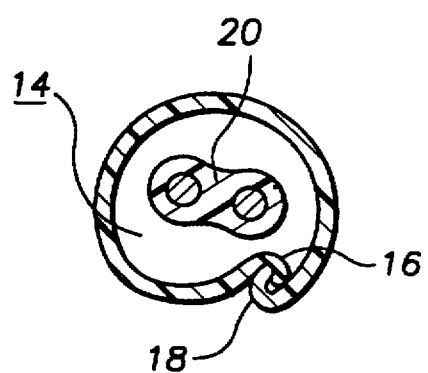
FIG. 3 is a sectional view of the tubing of FIG. 2 after the inwardly directed interlocking lip and the outwardly directed interlocking lip have been interlocked.
Figure 4:
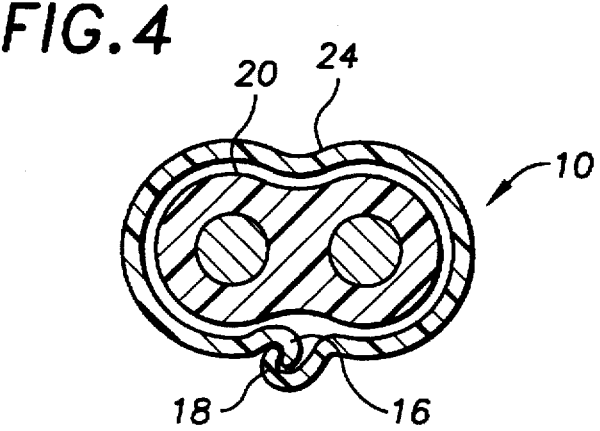
FIG. 4 is a sectional view of the tubing of FIG. 3 after applying heat to the tubing on the side opposite the interlocking lips.

Referring to FIG. 2, the second step of the process requires a length of electrical cord 20 to be positioned laterally through lateral insertion slit 12 into passageway 14 of heat shrinkable tubing 10. Referring to FIG. 3, once electrical cord 20 is positioned in passageway 14, outwardly directed interlocking lip 16 and inwardly directed interlocking lip 18 are moved into interlocking relationship. Referring to FIG. 4, heat is then applied to a top section 24 of heat shrinkable tubing 10 with a hair dryer set on high or with a heat gun if available. Top section 24 is located opposite the interlocked outwardly and inwardly directed interlocking lips 16,18. Heat is applied for a sufficient time to shrink top section 24 to conform to the surface of electrical cord 20.

Figure 5:
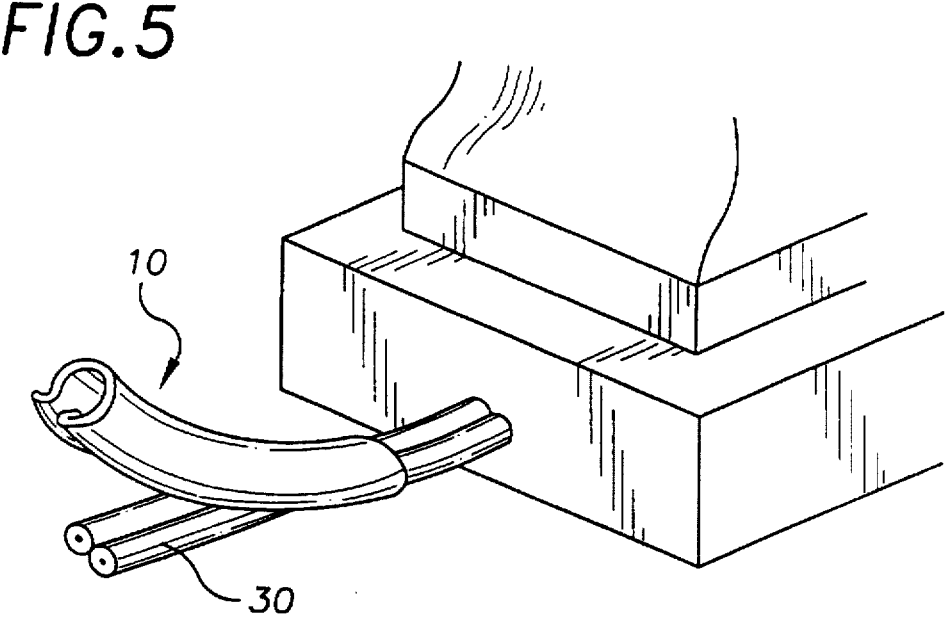
FIG. 5 is a perspective view showing positioning of the tubing of FIG. 1 on a representative length of electrical cord.
Figure 6:
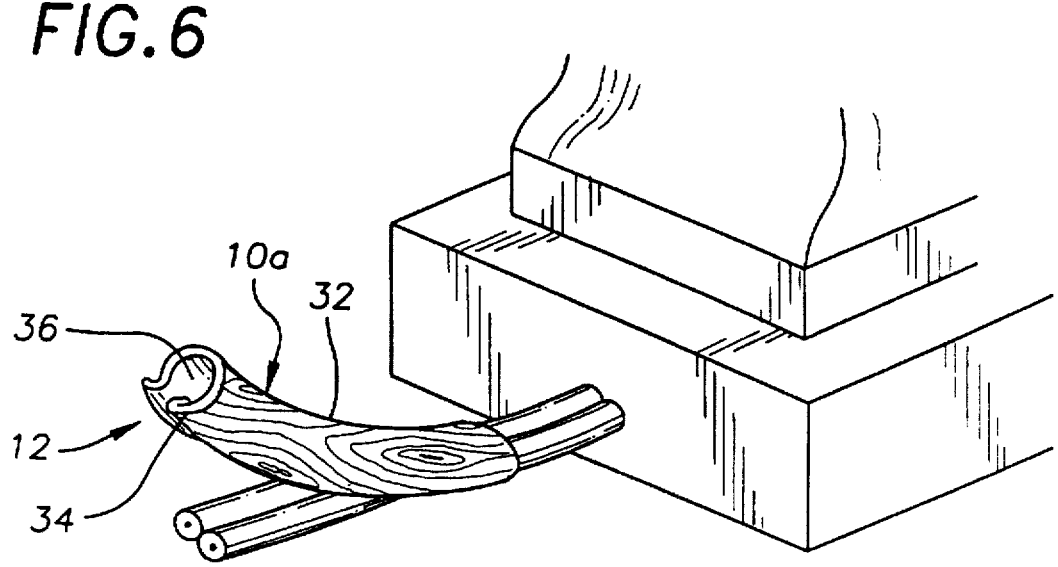
FIG. 6 is a perspective view of a second exemplary embodiment of the laterally slit shrink tubing used in the process for decorating electrical cords of the present invention showing a patterned exterior surface, the cord passageway and the lateral insertion slit.

FIG. 5 shows heat shrinkable tubing 10 partially positioned over a representative electrical cord 30 of an appliance. FIG. 6 shows a second exemplary section of heat shrinkable tubing 10a that is provided with an embossed outer surface 32. In this embodiment outer surface 32 is embossed with a wood grain pattern. In this embodiment, heat shrinkable tubing 10a is provided with a lateral insertion slit 12 defined by two straight side edges 34,36.

It can be seen from the preceding description that a process for decorating electrical cords has been provided that results in an electrical cord having characteristics selected to match the decor of a room; that is easily practiced; and that requires only common household devices to successfully practice.

It is noted that the embodiment of the process for decorating electrical cords described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A process for decorating electrical cords comprising the steps of:

providing a length of heat shrinkable tubing having a lateral insertion slit formed along said length thereof in connection with a passageway running said length, said heat shrinkable tubing having an outer surface embossed with a pattern thereon;

positioning a length of electrical cord laterally through said lateral insertion slit into said passageway of said heat shrinkable tubing; and applying heat to a top section of said heat shrinkable tubing, said top section being located opposite said lateral insertion slit, said heat being applied for a sufficient time to shrink said top section of said heat shrinkable tubing.

2. The process for decorating electrical cords of claim 1 wherein:

said heat shrinkable tubing provided includes an outwardly directed interlocking lip defining one edge of said lateral insertion slit and an inwardly directed interlocking lip defining an opposite edge of said lateral insertion slit, said outwardly and said inwardly directed interlocking lips being interlockable to maintain said heat shrinkable tubing closed around a length of electrical cord; and said process further includes the step of:

moving said outwardly and inwardly directed interlocking lips into interlocked relationship after positioning a length of electrical cord laterally through said lateral insertion slit into said passageway of said heat shrinkable tubing.

* * * * *